Sept. 2, 1958   C. J. SMITH ET AL   2,850,275
HYDRAULIC DAMPENER
Filed Aug. 12, 1955
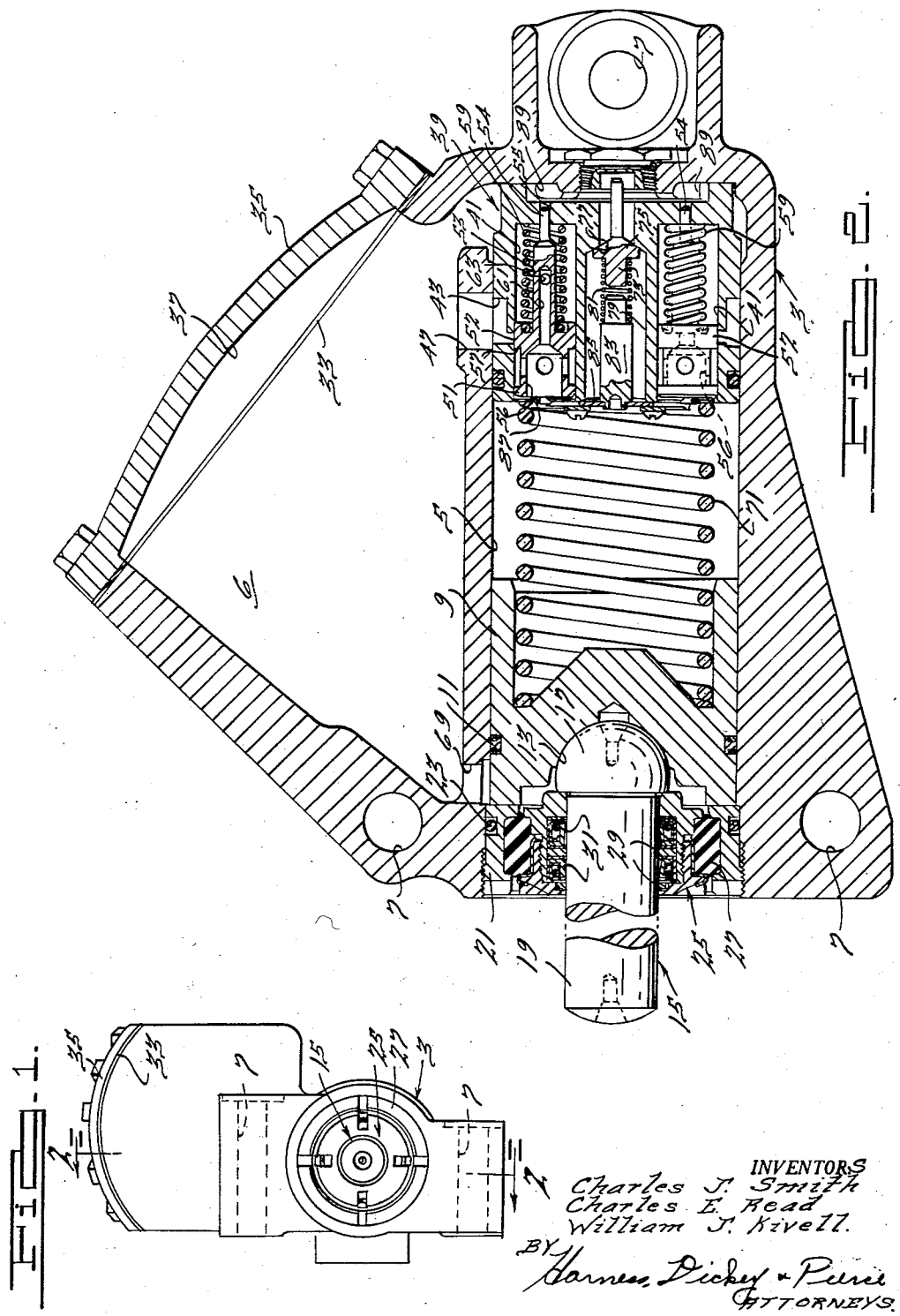
INVENTORS
Charles J. Smith
Charles E. Read
William J. Kivell
BY Harness, Dickey & Pierce
ATTORNEYS

United States Patent Office 2,850,275
Patented Sept. 2, 1958

2,850,275

HYDRAULIC DAMPENER

Charles J. Smith, Charles E. Read, and William J. Kivell, Monroe, Mich., assignors to Monroe Auto Equipment Company, a corporation of Michigan Application August 12, 1955, Serial No. 527,966

3 Claims. (Cl. 267—8)

This invention relates generally to hydraulic dampeners, and more particularly to a hydraulic bump stop adapted to dampen or cushion the movement of a member in one direction.

In many devices and vehicles, it is necessary to cushion or dampen the movement of a moving member. Such member may be moving relatively rapidly and may be relatively heavy so that the momentum thereof is extremely high. This is particularly true in military tanks wherein it is necessary to dampen the movement of bogey wheel suspension arms. While arrangements have been devised for such dampening operation, none have proven entirely satisfactory. Applicants have, however, developed a hydraulic dampening device which will effectively dampen the movement of a member of the aforementioned type in one direction.

It is, therefore, an object of this invention to provide a hydraulic dampener which is designed to dampen the movement of a member having high momentum.

It is a further object of this invention to provide a device of the aforementioned type which will not bind or become inoperative even though the member whose movement is to be dampened causes forces to be exerted in more than one direction.

It is a still further object of this invention to provide a hydraulic dampener of the aforementioned type which is relatively compact in size, exceptionally durable in construction, and relatively inexpensive to manufacture.

It is a still further object of this invention to provide in a hydraulic dampener of the aforementioned type an improved arrangement for accommodating displaced hydraulic fluid during the dampening operation.

It is a still further object of this invention to provide a hydraulic dampener of the aforementioned type in which certain of the parts are flexibly mounted so as to improve the operation of the device.

These and other objects of this invention will become apparent from the following detailed description taken in conjunction with the accompanying drawing, in which:

Figure 1 is a front elevational view of a hydraulic dampener of this invention; and Fig. 2 is an enlarged sectional view of the structure illustrated in Figure 1, taken along the line 2—2 thereof.

Referring now to the drawing, it will be seen that the hydraulic dampener includes a housing 3 which may be formed of cast metal or the like and which provides a hollow cylindrical bore 5 therein and an adjacent hollow chamber 6. The housing is provided with suitable apertures 7 which are adapted to receive fastening means for attaching it to a device, such as a vehicle, having a movable member whose movement in one direction is to be dampened. A bore-fitting piston 9 is slidably disposed in the bore 5 and carries a suitable piston ring 11 in wiping engagement with the wall of the bore 5. The front face of the piston 9 has a socket or recess 13 therein which is of a partially spherical shape. A plunger 15 is provided which has a ball-like head 17 on the inner end thereof for engagement with the socket 13 so that the ball head is capable of universal movement in the socket. Extending outwardly from the plunger head 13 is a plunger shaft portion 19 which is slidably and flexibly supported in the housing 3. In this connection, a ring-like member 21 is threaded into the housing wall at the outer end of the housing. An O-ring 23 is provided between the ring 21 and the housing wall to prevent leakage of fluid therebetween. A bushing and seal assembly 25 is disposed radially inwardly of the ring 21 and connected therewith through an annular flexible ring 27 which permits the bushing and seal assembly 25 to float within the limits of flexibility of the ring 27 relative to the ring 21. The bushing and seal assembly 25 includes ring-like bushings 29 and seals 31. The ring 21, rubber ring 27 and bushing and seal assembly 25 close the outer end of the housing bore 5 but permit the plunger to move axially thereof and to float within limits relative thereto so that a member whose movement is to be cushioned, which engages the outer end of the plunger 15 to move the same inwardly, will not cause binding of the plunger or the piston even if the forces exerted thereby are not all axially of the bore 5.

The housing is mounted on a device, such as a vehicle, so that a movable member, whose movement is to be dampened, engages the outer end of the plunger 15 and moves the same inwardly, which movement causes the piston 9 to move axially inwardly in the bore 5. The bore 5 is filled with hydraulic fluid. The housing chamber 6 has a portion thereof closed by means of a flexible diaphragm 33 which, in the particular embodiment, closes an opening at the upper rear portion of the chamber and is secured to the housing by means of a cover 35. The chamber 6 is filled with hydraulic liquid but the space 37 between the cover 35 and the diaphragm 33 is filled with fluid. It has been found that by filling the space 37 with air at atmospheric pressure, the device will operate satisfactorily, but in certain applications it may be desirable to charge the space 37 with air, nitrogen or the like at pressures exceeding atmospheric pressure. While the flexible diaphragm may be made of any suitable material, it has been found that nylon fabric coated with "Neoprene" provides a satisfactory flexible diaphragm.

The bore 5 and chamber 6 communicate with each other through a valve body 39 mounted in the opposite end of the bore 5 from the plunger. The valve body 39 is provided with a plurality of circumferentially spaced axially extending bores 41, there being four of such bores in the particular illustrated embodiment. The valve body is provided with an annular groove 43 around the periphery thereof which communicates with each of the bores 41. The groove 43 in turn communicates with an aperture 47 in the wall of the bore 5 so that hydraulic liquid in the bore 5 can flow therefrom to the chamber 6 through the valve body bores 41, groove 43 and aperture 47 in the housing bore wall. A compression valve 51 is disposed in each of the valve body bores 41. Each of the compression valves 51 has a plunger or bore-fitting piston portion 52 and a shank portion 53 extending inwardly from the plunger portion. The extreme inner end of each valve 51 has a pin portion 54 which is slidably supported in an aperture 55 in the inner end of the valve body 39. The outer end of the plunger portion of each valve 51 has an aperture 56 therein which communicates with the bore 5. Each aperture 56 communicates with an annular groove 57 in the periphery of the plunger portion 52 of each compression valve 51. Each annular groove 57 is adapted to communicate with the valve body groove 43 when its compression valve 51 is moved inwardly of its normal position, as illustrated in the drawing, by fluid pressure in the bore 5. A coil spring 59 surrounds the shank portion 53 of each compression valve and abuts the end of the bore 41 and the inner end of the valve plunger portion 52, so as to urge the valve outwardly or to the left as viewed in Fig. 2. The shank portion of each compression valve has an axially extending passage 61 therein which communicates with the aperture 56 in each compression valve. The shank is cross-drilled to provide a passage 63 so that hydraulic liquid can flow from the bore 5 through the compression valve opening 56, passage 61 and cross-drilled passage 63 into the portion of the bore 41 behind the bore-fitting portion of the valve. While hydraulic pressure acts on both sides of each compression valve plunger portion, the pin-like portion 54 on the inner end of each valve provides the only area differential so that a greater fluid pressure per square inch exists on the outer portion of the valve to cause the same to move inwardly or to the right as viewed in Fig. 2 when the fluid pressure exceeds the opposing force exerted by the coil spring 59. The coil springs 59 engaging each of the compression valves may have slightly different rates so that they will not all open at the same time but will open successively as the fluid pressure in the bore increases or the springs may have the same rate, and constructing the valve plunger portions 52 so that the groove 57 in each will communicate with valve body groove 43 at a different point in its travel. However, as each valve moves inwardly or to the right, the groove 57 in each valve is brought into alignment with the valve body groove 43 so as to permit fluid to flow from the bore to the chamber 6. The amount of resistance offered by the coil springs 59 will, of course, determine the cushioning or dampening effect of the unit.

As the piston 9 moves inwardly or to the right, as viewed in Fig. 2, thus displacing hydraulic liquid from the bore 5 through the valve body and into the chamber, fluid will flow from the chamber 6 through a passage 69, in the wall portion of the housing defining the bore 5, and into the outer end of the bore on the left side of the piston. In view of the fact that the plunger 15 enters the bore 5 when the piston is moved to the right, all of the liquid which is displaced by the piston from the bore 5 into the chamber 6 cannot flow to the opposite side of the piston. Therefore, the flexible diaphragm 33 will permit the chamber to expand to accommodate the excess liquid. The diaphragm, therefore, provides a variable volume chamber which will be completely filled with hydraulic liquid at all times.

After the piston 9 has been moved inwardly or to the right and the impact or movement of the movable member has been dampened, a coil spring 71, which is disposed in the bore 5 and has one end engaging the valve body 39 and the other end engaging the piston 9, will return the piston to the left to its initial outward position. Upon this return movement, hydraulic liquid in the outer or left-hand end of the bore 5 will flow back into the chamber 6 through the passage 69. The valve body 39 is provided with an intake valve 73 which will open due to the differential in fluid pressure between the chamber 6 and the adjacent portion of the bore 5 to permit hydraulic fluid to flow back into the outer end of the bore. The intake valve 73 includes a valve member 75 normally retained against a valve seat 77 in a bore 79 of the valve body by means of a coil spring 81 which engages the valve 75 and engages a stem 83 which is connected at its inner end to a disk or plate-like member 85 which overlies the outer end of the valve body 39. An annular wire ring 87 is disposed between the plate 85 and the outer face of the valve body 39. Wire ring 87 and the plate 85 limit the outward movement of the compression valves 51, and the plate member 85 is suitably slotted and notched so as not to interfere with the flow of liquid to the compression valves and from the intake valve. The outer end of the intake bore 79 of the valve body communicates through suitable slots 89 in the housing with the chamber 6 so as to permit fluid to flow from the chamber to the bore on the return stroke of the piston. A suitable filler plug is provided in the right-hand end of the housing to permit the device to be refilled when necessary. It will thus be seen that at all times the bore 5 is completely filled with hydraulic liquid on both sides of the piston so that no aeration exists, and there will be no air pockets or voids in the bore so that the unit will efficiently and quickly dampen the movement of the movable member. Still further, with the variable volume chamber provided by the flexible diaphragm, a relatively simple and inexpensive unit is provided which will properly dampen the movement of a rapidly moving, relatively heavy member.

What is claimed is:

1. A hydraulic dampener, including a housing having a bore therein adapted to contain hydraulic fluid, a bore-fitting piston slidably disposed in said bore, a plunger operatively connected with said piston and having a portion thereof projecting outwardly beyond one end of said housing in position to be engaged and moved inwardly by a member whose movement is to be dampened so as to cause said piston to slide in said bore in one direction, said housing having a closed chamber adapted to contain hydraulic fluid, a flexible diaphragm closing a portion of said chamber, a valve body mounted in the opposite end of said housing bore from said plunger, passageway means in said valve body for communicating said bore with said chamber, a plurality of compression valves movably supported in said body for controlling the flow of hydraulic fluid between said bore and said chamber when said piston moves towards said valve body, spring means normally retaining each of said compression valves in a closed position wherein said body passageway means is closed against the flow of fluid from said bore to said chamber, said compression valves being actuatable to open position by fluid pressure in said bore when said piston moves in said one direction towards said valve body to permit fluid to flow from said bore to said chamber through said valve body passageway means, an intake valve carried by said valve body and communicating with said bore and with said chamber to permit fluid to flow from said chamber to said bore when said piston moves away from said valve body, resilient means normally retaining said intake valve in its closed position, and spring means operatively connected between said piston and said housing resiliently urging said piston away from said valve body.

2. A hydraulic dampener, including a housing having a bore therein adapted to contain hydraulic fluid, a bore-fitting piston slidably disposed in said bore, a plunger operatively conected with said piston and having a portion thereof projecting outwardly beyond one end of said housing in position to be engaged and moved inwardly by a member whose movement is to be dampened so as to cause said piston to slide in said bore in one direction, said housing having a closed chamber adapted to contain hydraulic fluid, a flexible diaphragm closing a portion of said chamber, a valve body mounted in the opposite end of said housing bore from said plunger, passageway means in said valve body for communicating said bore with said chamber, a plurality of compression valves movably supported in said body for controlling the flow of hydraulic fluid between said bore and said chamber when said piston moves towards said valve body, spring means normally retaining each of said compression valves in a closed position wherein said body passageway means is closed against the flow of fluid from said bore to said chamber, said compression valves being actuatable to open position by fluid pressure in said bore when said piston moves in said one direction towards said valve body to permit fluid to flow from said bore to said chamber through said valve body passageway means, each of said compression valves and its spring means being constructed so that each of said compression valves will open under different fluid pressure forces, an intake valve carried by said valve body and communicating with said bore and with said chamber to permit fluid to flow from said chamber to said bore when said piston moves away from said valve body, resilient means normally retaining said intake valve in its closed position, and spring means operatively connected between said piston and said housing resiliently urging said piston away from said valve body.

3. A hydraulic dampener, including a housing having a bore therein adapted to contain hydraulic fluid, a bore-fitting piston slidably disposed in said bore and having a socket in one face thereof, a plunger having a ball-like head on one end thereof disposed in said piston socket and having a shaft-like portion projecting beyond one end of said housing, a bushing extending over said plunger and removably sealed to said housing, a second bushing disposed within said first bushing and substantially coaxial therewith for slidably engaging said plunger for movement axially thereof, means flexible connecting said first bushing to said second bushing, means providing a seal between said plunger and said second bushing so that one end of said housing bore is closed and said plunger is slidably and sealingly supported therein, said housing having a variable volume closed chamber adapted to contain hydraulic fluid, and valve means connecting said housing bore and said housing chamber and adapted to control the flow of hydraulic fluid between said bore and said chamber so that movement of said piston in said bore in at least one direction is effectively cushioned.

References Cited in the file of this patent

UNITED STATES PATENTS

| | | |
|---|---|---|
| 2,038,032 | Flynn | Apr. 21, 1936 |
| 2,244,274 | Walden | June 3, 1941 |
| 2,308,404 | Thornhill | Jan. 12, 1943 |
| 2,324,281 | Cowey | July 13, 1943 |
| 2,469,275 | Rossman | May 3, 1949 |
| 2,640,693 | Magrum | June 2, 1953 |

FOREIGN PATENTS

| | | |
|---|---|---|
| 422,527 | Great Britain | Jan. 14, 1935 |